United States Patent [19]

Kaku et al.

[11] Patent Number: 5,631,923
[45] Date of Patent: May 20, 1997

[54] TWO-WIRE FULL-DUPLEX MODEM

[75] Inventors: Takashi Kaku; Toyomi Obikawa, both of Kawasaki, Japan

[73] Assignee: Fujitsu Limited, Kawasaki, Japan

[21] Appl. No.: 89,190

[22] Filed: Jul. 12, 1993

[30] Foreign Application Priority Data

Aug. 12, 1992 [JP] Japan ..................... 4-215172

[51] Int. Cl.⁶ ..................... H03D 3/24
[52] U.S. Cl. ..................... 375/222; 370/280; 370/286; 379/3
[58] Field of Search ..................... 375/8, 36; 370/29, 370/32.1; 379/1, 3, 26, 93, 94

[56] References Cited

U.S. PATENT DOCUMENTS

| | | | |
|---|---|---|---|
| 4,241,311 | 12/1980 | Massey | 328/167 |
| 4,799,214 | 1/1989 | Kaku | 370/32.1 |
| 5,166,975 | 11/1992 | Maei | 379/93 |
| 5,214,637 | 5/1993 | Sridhar et al. | 375/8 |
| 5,347,539 | 9/1994 | Sridhar et al. | 375/8 |

FOREIGN PATENT DOCUMENTS

| | | |
|---|---|---|
| 0 014 505 | 8/1980 | European Pat. Off. . |
| 0 454 036 | 10/1991 | European Pat. Off. . |
| 2 650 141 | 1/1991 | France . |

*Primary Examiner*—Stephen Chin
*Assistant Examiner*—T. Ghebretinsae
*Attorney, Agent, or Firm*—Staas & Halsey

[57] ABSTRACT

In a modem, after scrambling data which are time-divided into main data and secondary data, a 2 W–4 W conversion circuit sends the data to the two-wire line. An estimated echo component is subtracted from a signal which is available from the 2 W–4 W conversion circuit. Following this, the signal from the 2 W–4 W conversion circuit is demodulated, descrambled and separated into main data and secondary data. A generator polynomial for scrambling is different from a generator polynomial for descrambling. The modem comprises a line-trouble-detect part which samples data of the secondary channel, by multipoint sampling, to obtain the secondary data and detects the number of inversion points in the descrambled secondary channel data per unit time period. The line-trouble-detect part outputs a line-trouble signal which indicates that there is a trouble on the line if the number of detected inversion points is more than a predetermined number.

14 Claims, 9 Drawing Sheets

| INPUT DATA | OUTPUT DATA |
|---|---|
| 0 0 0 | 0 0 0 |
| 0 0 1 | 0 0 0 |
| 0 1 0 | 0 0 0 |
| 0 1 1 | 1 1 1 |
| 1 0 0 | 0 0 0 |
| 1 0 1 | 1 1 1 |
| 1 1 0 | 1 1 1 |
| 1 1 1 | 1 1 1 |

Fig. 8

TWO-WIRE FULL-DUPLEX MODEM

BACKGROUND OF THE INVENTION

1. Field of the Invention

The present invention is directed to a two-wire full-duplex modem which time-divides data into main channel data and secondary channel data by using a two-wire line in sending and receiving data.

In the market for modems for private lines, to meet a demand for reduction in line costs, two-wire full-duplex modems are gradually replacing four-wire full-duplex modems.

If a modem is the two-wire type, the charge for four wires is not applied, and therefore, a reduction in the line charge of about 5,000 yen per month is possible. In order to deal with a fault on private line in which two-wire full-duplex modems are used, the demand for automatic backup has increased, and so has the demand for network supervision.

2. Description of the Related Art

In two-wire full-duplex 9,600 bps modems, for example, a time division circuit time-divides 12,000 bps data which are in conformity with the CCITT recommendation V. 32 bis into main channel data of 9,600 bps and secondary channel data of 2,400 bps. The data are then scrambled and modulated by a transmitting means, and sent to a private line through a 2 W-4 W conversion circuit.

On the other hand, since a receive signal from the 2 W-4 W conversion circuit includes an echo component of a send signal, in full-duplex communication, an echo estimate part predicts the echo component of the transmitted signal. The echo component is subtracted by an adder part from the receive signal which is produced by the 2 W-4 W conversion circuit. Then, the signal is demodulated and descrambled by a receiving part, and divided into a 9,600 bps main channel and 2,400 bps secondary channel before being sent out to the terminal side.

In this manner, two-wire full-duplex communication is achieved.

By the way, the function of the secondary channel is to transmit a supervisory signal and a control signal to the network. These are low-speed signals of around 75 bps. Hence, the speed of these slow signals must be increased to the assigned speed of 2,400 bps. To this end, a received 75 bps signal is sampled by multipoint sampling, and thereby a 2,400 bps output signal is obtained.

When there is trouble on the private line, modems of this construction switch to a public line (i.e., a backup line).

However, modems of conventional construction have the following drawbacks:

(1) Even when a private line is disconnected, in a two-wire full-duplex modem, since the 2 W-4 W conversion circuit is connected to the line, the impedance of the line changes and becomes high. Hence, due to a change in the impedance, the echo component of the send signal changes and therefore remains even after subtraction of the echo component by the echo estimate part. The echo component will therefore appear as a receive signal and will be detected as a carrier by the receive part. As a result, an automatic equalizer operates, thereby performing normal receiving operation. Thus, the disconnection of the line cannot be detected, which makes it difficult to switch to the backup system.

(2) Similarly, since the quality of communication of the secondary channel is the same as the quality of communication of the main channel, when the line deteriorates, supervisory control by means of the secondary channel will be obstructed. This makes it difficult to switch to the backup system.

SUMMARY OF THE INVENTION

Hence, an object of the present invention is to offer a two-wire full-duplex modem which is capable of stably switching to the backup line to deal with deterioration of and trouble on the line.

A further object of the present invention is to offer a two-wire full-duplex modem which is capable of detecting a disconnection of a line and switching to the backup line.

Still another object of the present invention is to offer a two-wire full-duplex modem in which the communication quality in a secondary channel is better than that of a main channel and hence supervisory control by means of the secondary channel is possible even if there is some deterioration of the line quality.

According to the present invention, there is provided a two-wire full-duplex modem in which data which are time-divided into a main channel and a secondary channel are scrambled, modulated, and thereafter sent by a 2 W-4 W conversion circuit to the two-wire line, following which an estimated echo component which is calculated from the scramble data is subtracted from a signal from the 2 W-4 W conversion circuit and the signal from the 2 W-4 W conversion circuit is demodulated, descrambled and separated into main data and secondary data, the two-wire full-duplex modem having a generator polynomial for the scrambling and a generator polynomial for the descrambling which are different from each other, which comprises:

a line-trouble-detect part for sampling data on the secondary channel by multipoint sampling to obtain the secondary data and detecting the number of inversion points in the scrambled secondary channel data per unit time, the line-trouble-detect part outputting a line-trouble signal which indicates that there is trouble on the line if the detected conversion points are more than a predetermined number.

In the two-wire full-duplex modem described above, the line side of the 2 W-4 W conversion circuit is switched to a backup line in accordance with the line-trouble signal which is outputted by said line-trouble-detect part.

Further, according to the present invention, there is provided a two-wire full-duplex modem in which data which are time-divided into a main channel and a secondary channel are scrambled, modulated, and thereafter sent by a 2 W-4 W conversion circuit to the two-wire line, following which an estimated echo component which is calculated from the scramble data is subtracted from a signal from the 2 W-4 W conversion circuit and the signal from the 2 W-4 W conversion circuit is demodulated, descrambled and separated into main data and secondary data, the two-wire full-duplex modem having a generator polynomial for the scrambling and a generator polynomial for the descrambling which are different from each other, which comprises:

a majority circuit, to be defined hereinafter for outputting a majority signal between the predetermined number of bits of said descrambled secondary channel data.

The two-wire full-duplex modem described above includes a majority circuit for outputting a majority signal between the predetermined number of bits of said descrambled secondary channel data.

BRIEF DESCRIPTION OF THE DRAWINGS

The present invention will be more clearly understood from the description as set forth below with reference to the accompanying drawings.

DESCRIPTION OF THE PREFERRED EMBODIMENTS

Figure 1A:
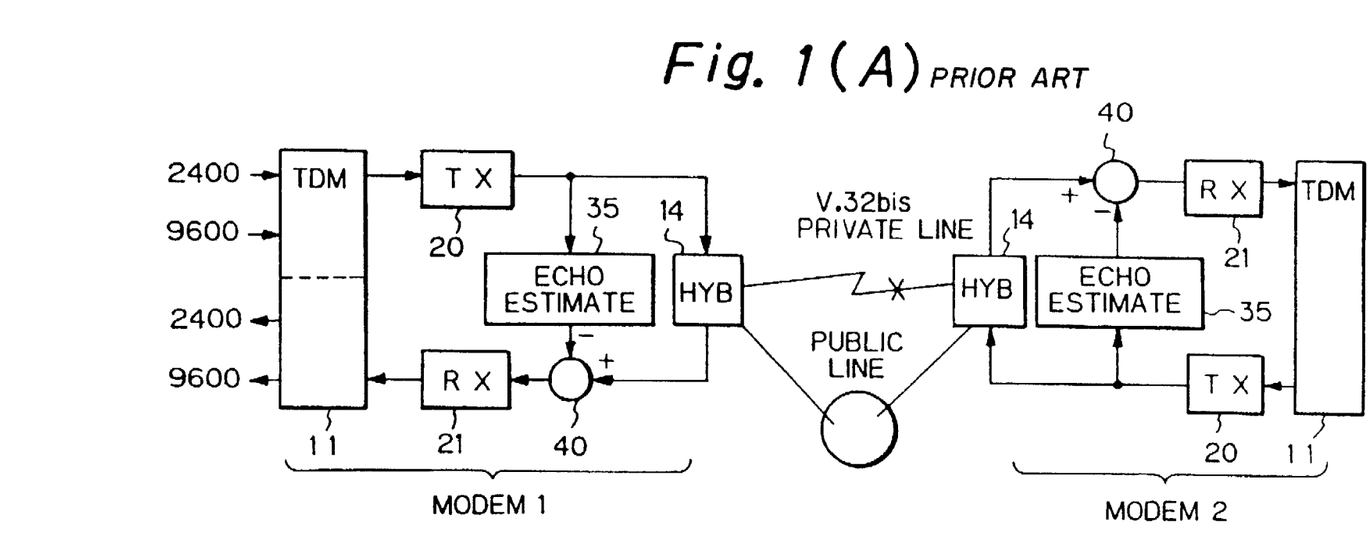
FIGS. 1(A)–1(C) are explanatory diagrams for explaining related art.
Figure 1B:
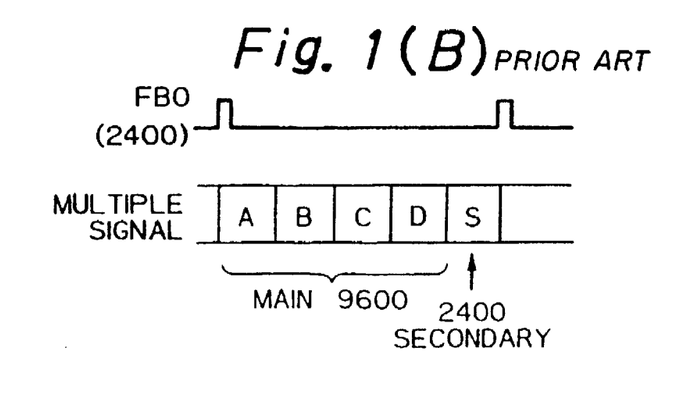
Figure 1C:
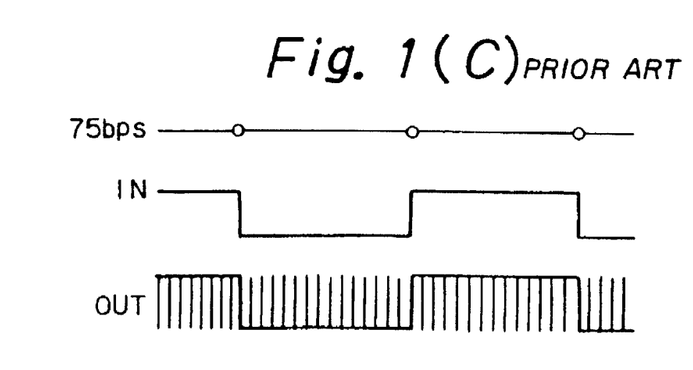

Before describing the preferred embodiments according to the present invention, examples of the related art are provided with reference to FIGS. 1(A)–1(C).

FIGS. 1(A)–1(C) are explanatory diagrams for explaining related art.

In two-wire full-duplex 9,600 bps modems 1 and 2, for example, such as those shown in FIG. 1(A), a time division circuit 11 time-divides 12,000 bps data which are in conformity with the CCITT recommendation V. 32 bis into main channel data of 9,600 bps divided into four channels A, B, C and D and secondary channel data of 2,400 bps for one secondary channel S as shown in FIG. 1(B). The data are then scrambled and modulated by a send part 20, and sent to a private line through a 2 W–4 W conversion circuit 14.

On the other hand, since a receive signal from the 2 W–4 W conversion circuit 14 includes an echo component of a send signal, in full-duplex communication, an echo estimate part 35 predicts the echo component of the send signal. The echo component is subtracted by an adder part 40 from the receive signal which is received from the 2 W–4 W conversion circuit 14. Then, the signal is demodulated and descrambled by a receive part 21, and divided into main channel data of 9,600 bps and secondary channel of 2,400 bps data before sent out to the terminal side.

In this manner, two-wire full-duplex communication is achieved.

By the way, the function of the secondary channel is to transmit a supervising signal and a control signal for the network which are low speed signals of around 75 bps. Hence, the speed of these slow signals must be increased to the set speed of 2,400 bps. To this end, as shown in FIG. 1(C), a 75 bps signal that is received is sampled by multipoint sampling so that a 2,400 bps output signal is obtained.

When there is a trouble on the line, modems of such a construction switch to a public line (i.e., backup line).

However, such modems of the conventional construction have the following drawbacks.

Even when a private line is disconnected, in a two-wire full-duplex modem, since the 2 W–4 W conversion circuit 14 is connected to the line, an impedance on the line changes and becomes high. Hence, due to a change in the impedance, the echo component of the send signal changes and is therefore not removed even after subtraction of the estimated echo component produced by the echo estimate part 35. The echo component will therefore appear as a receive signal and will be detected as a carrier by the receive part 21. As a result, an automatic equalizer operates thereby performing normal receiving operation. Thus, the disconnection of the line cannot be detected, which makes it difficult to switch to the backup line.

Similarly, since the quality of communication of the secondary channel is the same as the quality of communication of the main channel, when the line deteriorates, supervisory control by means of the secondary channel will be obstructed. This makes it difficult to switch to the backup line.

Figure 2A:
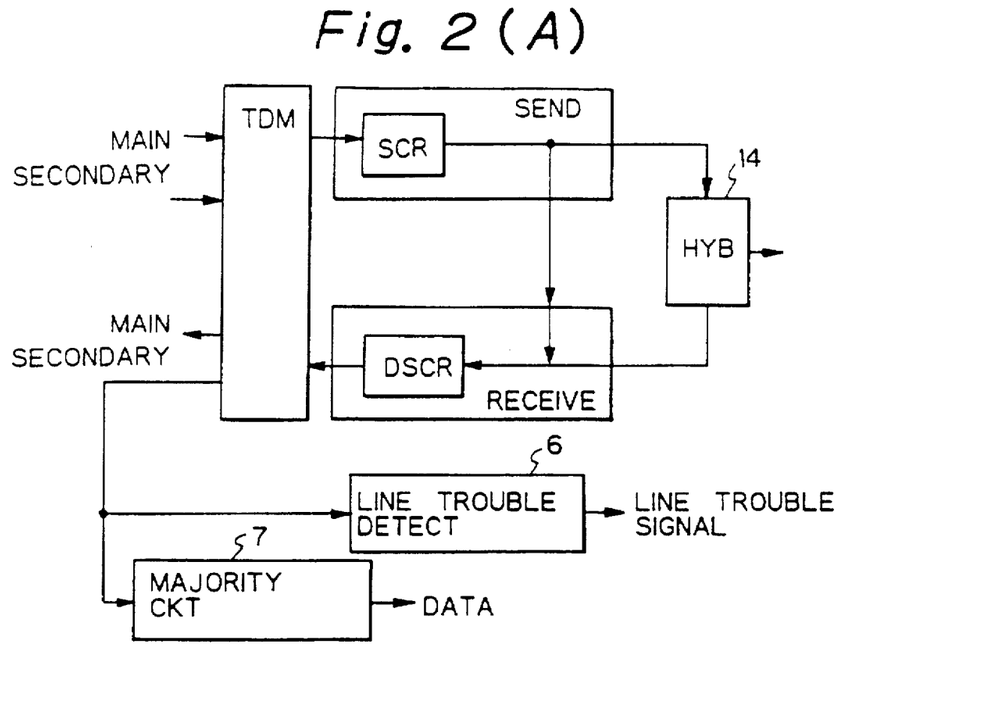
FIGS. 2(A) and 2(B) show the principles of the present invention.
Figure 2B:
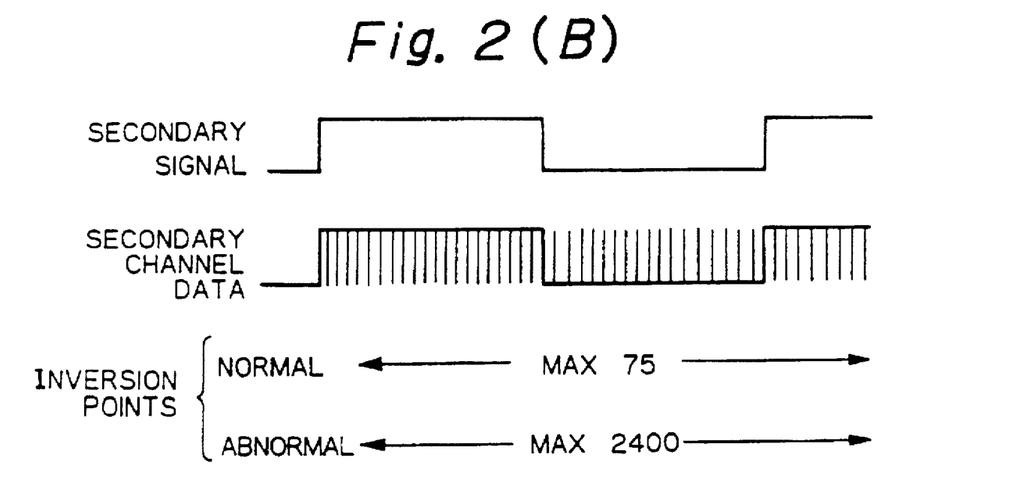

FIGS. 2(A) and 2(B) are views showing the principles of the present invention.

In a two-wire full-duplex modem according to a first aspect of the present invention, data which are time-divided into a main channel and a secondary channel are scrambled, modulated, and thereafter sent by a 2 W–4 W conversion circuit 14 to the two-wire line, following which an estimated echo component which is calculated from the scrambled data is subtracted from a signal from the 2 W–4 W conversion circuit 14 and the signal from the 2 W–4 W conversion circuit 14 is demodulated, descrambled and separated into main data and secondary data, the two-wire full-duplex modem having a generator polynomial for the scrambling and a generator polynomial for the descrambling which are different from each other. The two-wire full-duplex modem is characterized in that a line-trouble-detect part 6 is disposed which samples data of the secondary channel by multipoint sampling to obtain the secondary data and detects the number of inversion points in the descrambled secondary channel data per unit time period, and in that the line-trouble-detect part 6 outputs a line-trouble signal which indicates that there is a trouble on the line if the detected inversion points are more than a predetermined number.

According to a second aspect of the present invention, the two-wire full-duplex modem of the first aspect requires that the line side of the 2 W–4 W conversion circuit 14 is switched to a backup line in accordance with the line-trouble signal which is outputted by said line-trouble detect part 6.

In a two-wire full-duplex modem according to a third aspect of the present invention, data which are time-divided into a main channel and a secondary channel are scrambled, modulated, and thereafter sent by a 2 W–4 W conversion circuit 14 to the two-wire line, following which an estimated echo component which is calculated from the scramble data is subtracted from a signal from the 2 W–4 W conversion circuit 14 and the signal from the 2 W–4 W conversion circuit 14 is demodulated, descrambled and separated into main data and secondary data, the two-wire full-duplex modem having a generator polynomial for the scrambling and a generator polynomial for the descrambling which are different from each other. The two-wire full-duplex modem is characterized by comprising a majority circuit 7 for outputting a majority signal between the predetermined number of bits of said descrambled secondary channel data.

According to a fourth aspect of the present invention, the two-wire full-duplex modem of the first aspect or the second aspect is characterized by comprising a majority circuit 7 for outputting a majority signal between the predetermined number of bits of said descrambled secondary channel data.

According to the first aspect of the present invention, the number of inversion points of 75 bps data is maximum 75 in the secondary channel, if the echo component of the send side is removed. If the echo component of the send side is not removed due to a disconnection of the line, descramble received data of the secondary channel becomes random data, whereby the number of data inversion points increases to a maximum of 2,400, because generator polynomials for scrambling of the call side and the answer side are different from each other.

Hence, by calculating the number of the inversion points in the descramble data per unit time period, a disconnection of the line can be detected and the switching to a backup line operation will be invoked without fail.

According to the third and fourth aspects of the present invention, the descramble data in the secondary channel may be at the speed of 2,400 bps and the secondary data may be at the speed of 75 bps, both lower speeds than that of the main data. By utilizing this, the quality of communication of the secondary channel is improved.

Hence, by using the majority circuit 7 to correct an error due to deterioration of the line to a certain extent, the quality of communication of the secondary channel is improved, which in turn makes supervisory control and hence smooth backup switching or the like possible.

(a) Explanation of Two-Way Full-Duplex Modem

Figure 3:
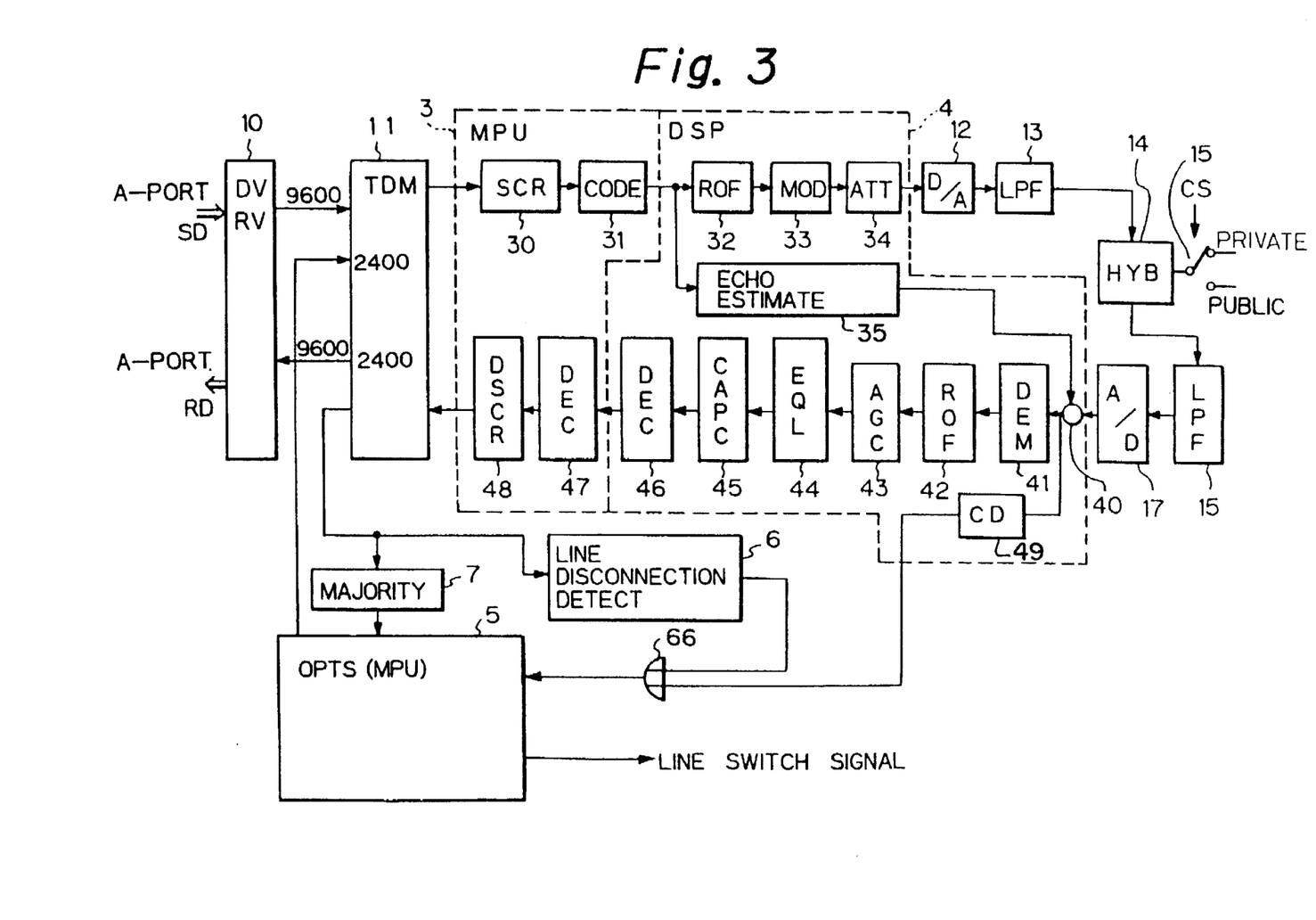
FIG. 3 shows the overall structure of a modem according to a preferred embodiment of the present invention.

FIG. 3 is a construction view showing the overall structure of a two-way full-duplex modem according to a preferred embodiment of the present invention.

In the drawing, indicated at numerical reference 10, is a driver/receiver for driving a send signal SD from the A-port. The driver/receiver 10 also receives a 9,600 bps receive signal and outputs the same as a receive signal RD which is sent to the A-port. Indicated at numerical reference 11 is a time division circuit for time division multiplexing of the main data, at 9,600 bps, from the driver/receiver 10 and secondary data, at 2,400 bps, from a supervisory part 5, which will be described later, to obtain data at 12,000 bps and for separating receive data from the descrambler 48 into main data of 9,600 bps and secondary data of 2,400 bps.

Figure 5:
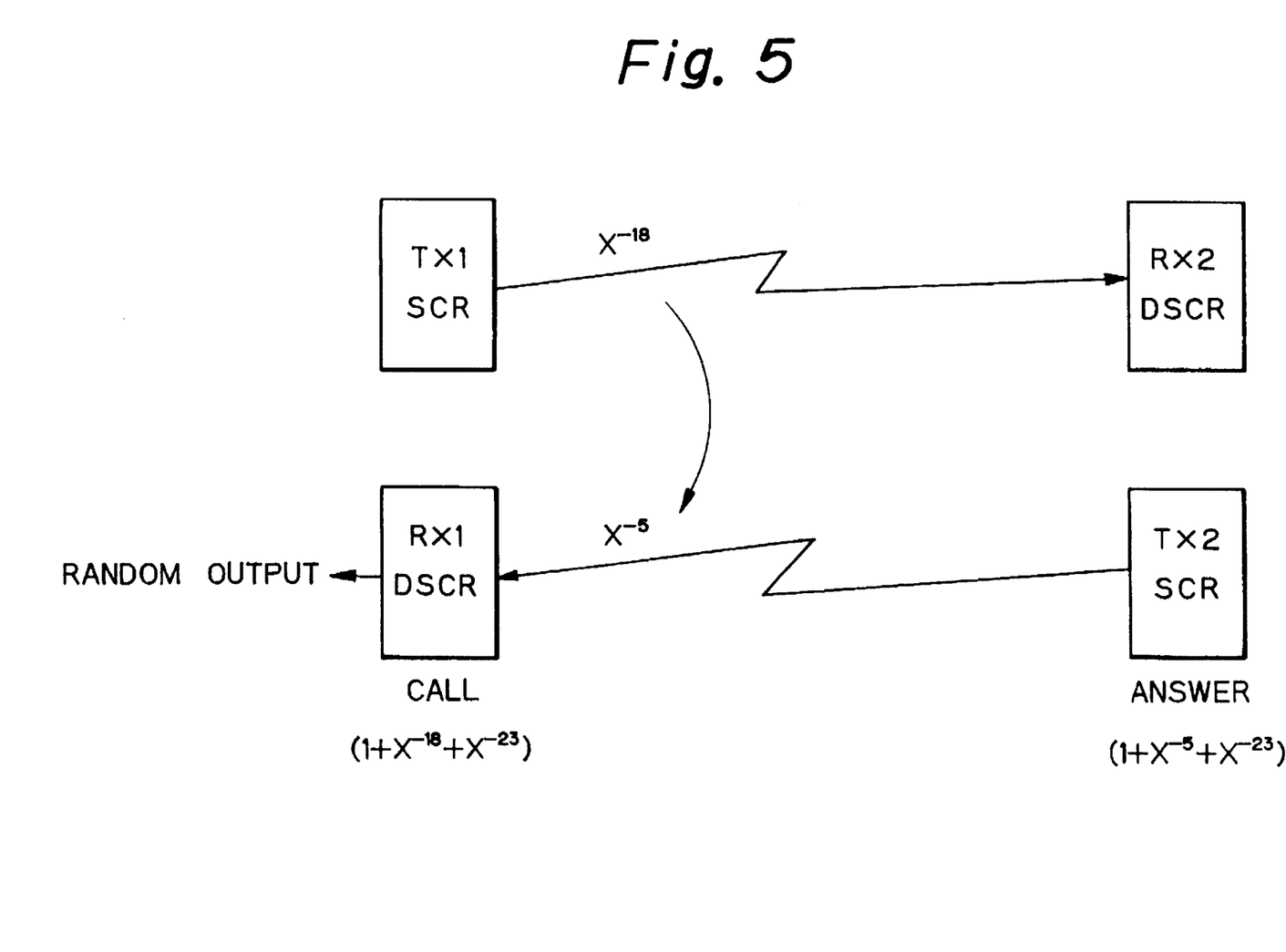
FIG. 5 is an explanatory diagram for explaining line disconnection detection according to the preferred embodiment of the present invention.

Indicated at numerical reference 30 is a scrambler for scrambling data in accordance with generator polynomials shown in FIG. 5 so that the data becomes random data. Indicated at numerical reference 31 is a coding part for coding the scramble data. Indicated at numerical reference 32 is a roll-off filter for cutting out undesired frequency band components.

Indicated at numerical reference 33 is a modulation part for modulating an output of the roll-off filter 32 with a modulation wave. Indicated at numerical reference 34 is an attenuator for performing level adjustment. Indicated at numerical reference 35 is an echo estimate part for computing an estimated echo component from a send output from the coding part 31.

Indicated at numerical reference 12 is a D/A (Digital/Analog) convertor for converting a digital output of the attenuator 34 into an analog signal. Indicated at numerical reference 13 is a low-pass filter for cutting undesired high-frequency components. Indicated at numerical reference 14 is a 2 W–4 W conversion circuit which is connected to a two-wire line in order to perform 2 W–4 W conversion. Indicated at numerical reference 15 is a switch for switching a private line and a public line in response to a line switch signal CS from the supervisory part 5.

Indicated at numerical reference 16 is a low pass filter for cutting an undesired high-frequency component of the receive signal which is received from the 2 W–4 W conversion circuit 14. Indicated at numerical reference 17 is an A/D (Analog/Digital) convertor for converting an analog signal from the low pass filter 16 into a digital signal.

An adder part, indicated at 40, subtracts the estimated echo component which is found by the echo estimate part 35 in the receive signal which is outputted by the A/D convertor 17. Indicated at numerical reference 41 is a demodulation part for demodulating the output of the adder part 40 using a demodulation signal. Indicated at numerical reference 42 is a roll-off filter for cutting undesired frequency band components.

An AGC (Automatic Gain Control) part for automatically adjusting the level of an output of the roll-off filter 42 is indicated at numerical reference 43. An automatic equalizer part for equalizing the output of the AGC part 43 is indicated at numerical reference 44. A carrier-automatic-phase-compensation part is indicated at numerical reference 45 which automatically compensates for the phase of a carrier. A decision part 46 for deciding the output of the carrier-automatic-phase-compensation part 45 is indicated at numerical reference 46.

Indicated at numerical reference 47 is a decoding part for decoding a signal output from the decision part 46. Indicated at numerical reference 48 is a descrambler which descrambles data in accordance with the generator polynomials shown in FIG. 4 and outputs the data to the time-division circuit 11. Indicated at numerical reference 49 is a carrier-detect part for detecting carrier at an output of the adder part 40 and for generating a carrier-detect signal.

Indicated at numerical reference 5 is a supervisory part which provides a sampling signal so as to sample a secondary signal of 75 bps by multipoint sampling and output 2,400 bps secondary data and send the secondary data to the time division circuit 11. The supervisory part 5 also converts 2,400 bps secondary data received from the time division circuit 11 into a secondary signal of 75 bps. The supervisory part 5 performs supervisory control.

A line-disconnection-detect-circuit, indicated at numerical reference 6, detects a line disconnection based on inversion points of secondary data from the time-division circuit 11. The line-disconnection-detect-circuit 6 will be described with reference to FIGS. 4 and 5. Indicated at numerical reference 66 is an OR circuit for finding the logical OR of a carrier disconnection detect signal which is outputted by the carrier detect part 49 and a line disconnection detect signal which is outputted by the line disconnection detect circuit 6 and for outputting the result to the supervisory part 5.

Indicated at numerical reference 7 is a majority circuit which determines a majority signal between the predetermined number of bits of secondary data, corrects any error in the data and outputs the data to the supervisory part 5. The majority circuit will be described with reference to FIGS. 7(A) and 7(B) and 8.

A microprocessor is indicated at numerical reference 3. The scrambler 30, the coding part 31, the decoding part 47 and the descrambler 48 operate under control of the microprocessor 3. A digital signal processor is indicated at numerical reference 4. The roll-off filter 32, the modulation part 33, the attenuator 34, the echo-estimate part 35, the adder part 40, the demodulation part 41, the roll-off filter 42, the AGC part 43, the automatic-equalizer part 44, the carrier-automatic-phase-compensation part 45, the decision part 46 and the carrier-detect part 49 operate under processor control of the digital signal processor 4.

Operations of this construction will be now described. The main send signal SD from the A-port is sent by the driver/receiver 10 to the time division circuit 11 as 9,600 bps main data. As shown in FIG. 1(C), a secondary signal of 75 bps available from the control part 5 is converted into 2,400 bps secondary data which is then supplied to the time division circuit 11.

The time division circuit 11, as shown in FIG. 1(B), time division multiplexes the 9,600 bps main data and the 2,400 bps secondary data and outputs the same as 12,000 bps send data.

The data are then descrambled by the scrambler 30 and coded by the coding part 31. The data are thereafter supplied to the roll-off filter 32 where the data bandwidth is limited, followed by modulation in the modulation part 33. Next, the level of the data is adjusted by the attenuator 34 and the data are converted into an analog signal by the D/A convertor 12. The high-frequency components of the analog signal are cut by the low pass filter 13. Then, the analog signal is transmitted on the two-wire line via the 2 W-4 W conversion circuit 14.

On the other hand, a signal from the 2 W-4 W conversion circuit 14 is passed to the low pass filter 16 where its high-frequency component is removed. The signal is then converted into a digital signal by the A/D convertor 17 and supplied to the adder part 40 so that an estimated echo component found by the echo estimate part 35 is subtracted from the converted digital signal. As a result, a pure receive signal is derived.

This receive signal is demodulated at the demodulation part 41. Following this, the signal bandwidth is controlled by the roll-off filter 42, the level of the signal is adjusted by the AGC part 43, and the signal is equalized by the automatic equalizer part 44. The phase component of a carrier of the signal is then adjusted by the carrier-automatic-phase-compensation part 45. Thereafter, the signal is decided by the decision part 46, decoded by the decoding part 47, descrambled by the descrambler 48, and finally supplied to the time-division circuit 11.

The time-division circuit 11 divides the 12,000 bps time-division-multiplex signal shown in FIG. 1(B) into 9,600 bps main data and 2,400 bps secondary data. The main data are outputted to the driver/receiver 10. The data are then outputted at the A-port as the receive data RD.

On the other hand, the secondary data are fed to the majority circuit 7 where a majority of the data is determined and corrected for errors. The data are then sent to the supervisory part 5 and the line-disconnection-detect part 6 which calculates the number of inversion points to detect a line disconnection. In response to the line-trouble-detect signal, the supervisory part 5 creates the switch signal CS which makes the switch 15 switch from the private line to the public line.

(b) Explanation of Circuit-Disconnection-Detect Part

Figure 4:
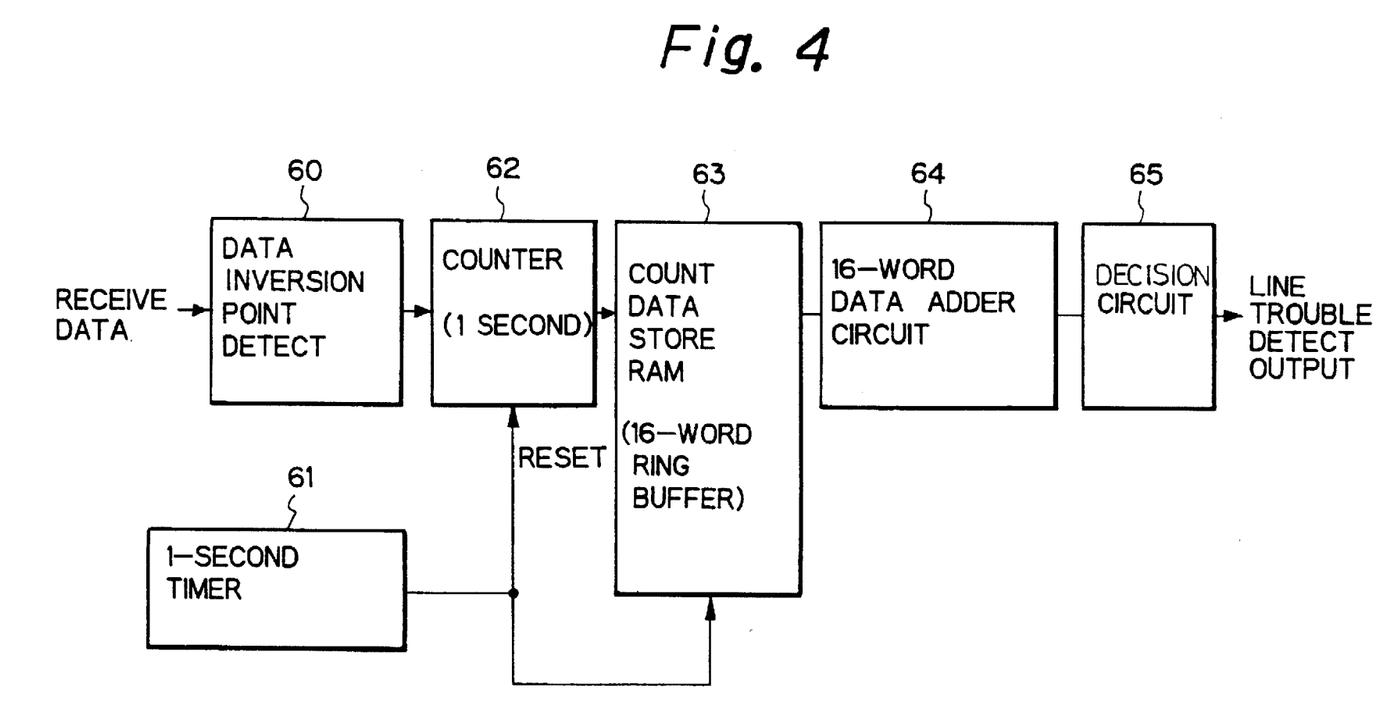
FIG. 4 is a block diagram showing a line disconnection detect circuit according to the preferred embodiment of the present invention.

FIG. 4 is a block diagram showing the line-disconnection-detect circuit according to the preferred embodiment of the present invention. FIG. 5 is an explanatory diagram for explaining line-disconnection-detection according to the preferred embodiment of the present invention.

In FIG. 4, indicated at numerical reference 60, is a data inversion-point-detect part for detecting inversion points in the 2,400 bps receive (secondary) data, and indicated at numerical reference 61 is a 1-second timer for generating a control signal every second. Indicated at numerical reference 62 is a counter which is reset by the control signal from the 1-second timer 61 and calculates the number of the conversion points per second.

A data store RAM composed of a 16-word ring buffer is indicated at numerical reference 63. The data store RAM 63 stores for 16 seconds the per second number of the inversion points which was found by the counter 62, and in response to an output of the 1-second timer 61, admits the data of the counter 62 thereinto. Indicated at numerical reference 64 is a 16-word-data-adder circuit for adding 16-word data in the data store RAM 63 and for outputting the number of the inversion points per 16 seconds. Indicated at numerical reference 65 is a decide circuit for comparing an output of the adder circuit 64 with a threshold value, deciding whether line-trouble has occurred, and for outputting a line-trouble detect signal.

Figure 6A:
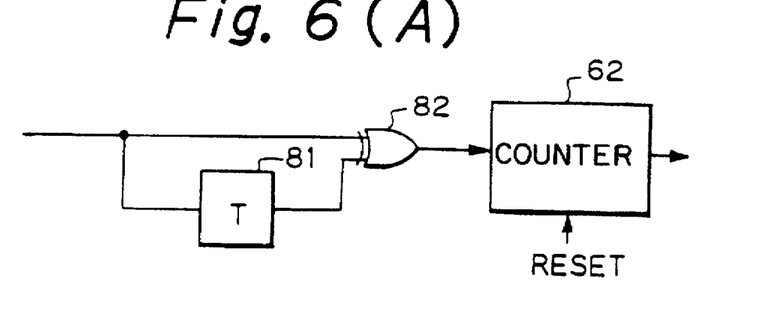
FIGS. 6(A)–6(D) are explanatory diagrams for explaining the operation of the line disconnection detect circuit shown in FIG. 4.
Figure 6B:
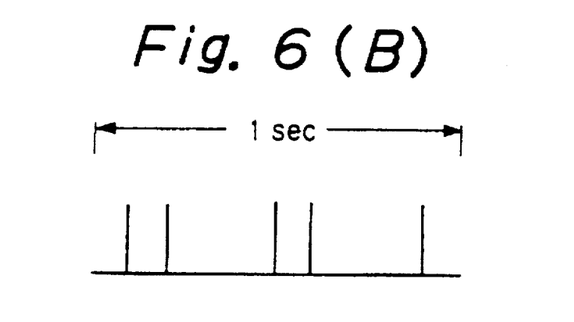

With reference to FIGS. 5 and FIG. 6(A)–6(B), the two-wire full-duplex modem requires that the scramble and descramble generator polynomials are different from each other between the up channel and the down channel to thereby eliminate correlation between the channels.

Disconnection of the line accompanies an abrupt change in the impedance on the line, and therefore, an echo of the send side will be sent back to the receive side. However, the echo canceler of the receive side is still not converged, and the waveform of the echo as it is is processed as a receive waveform, although the line is disconnected for a moment on the receive side. The EYE pattern remains open, and SQD which shows the condition of the quality of the line stays ON (i.e., condition excellent).

For this reason, it is not possible to detect trouble on the line from outside.

Incidentally, as described earlier, since the generator polynomials are different from each other between the send side and the receiver side, the echo sent back to the receive side is reproduced as random data.

The signal speed in the secondary channel is 75 bps. Hence, under a normal condition, the number of the inversion points is 75 at most. However, under an abnormal condition, since the echo component is random, in conformity with the line speed (2,400 bps), the number of the inversion points increases to a maximum of 2,400.

Therefore, by detecting the number of the data inversion points, trouble on the line can be sensed.

To realize this, as shown in FIG. 6(A) the 2,400 bps secondary data are supplied to the data inversion-point-detect part 60 to compare the current data with the data obtained at precedent sampling by using an exclusive OR gate circuit 82 and a 1-bit delay circuit 81. If the values of a bit and the subsequent bit are different from each other, it is recognized that a inversion point exists and the recognized inversion point is supplied, as a clock pulse, to the counter 62 which is located at the downstream side.

The 1-second timer 61 provides the counter 62 with a reset pulse every second, whereby write timing is supplied to the data store RAM 63.

Figure 6C:
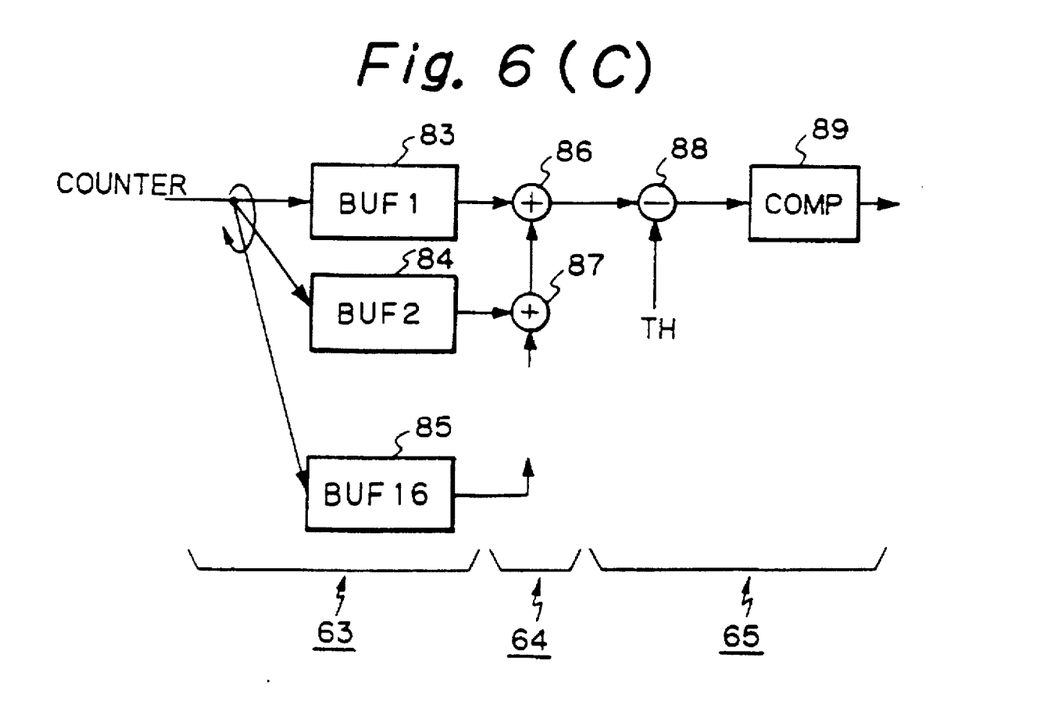

The counter 62 counts up in accordance with the clock pulse from the data inversion point-detect circuit 60 as shown in FIG. 6(B). The counter 62 resets its count every time it receives a reset signal from the timer 61, concurrently with which, results, which are yielded in the counter 62, are serially and recursively written in the data store RAM 63 in response to a write timing signal as shown in FIG. 6(C).

Since the adder circuit 64 adds up all data which are stored in the data store RAM 63, every time data of the counter 62 are written in the data store RAM 63, the adder circuit 64 adds up data for 16 seconds and outputs the same.

Figure 6D:
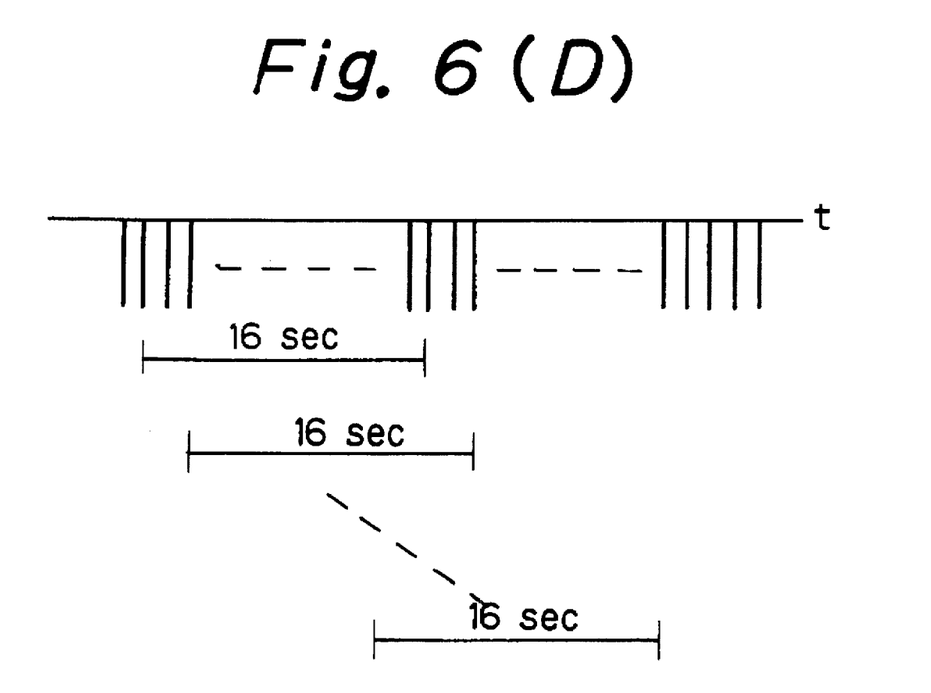

The output of the adder circuit 64 is output every second, and therefore, reflects a per-second change in the condition of the line as shown in FIG. 6(D). The per-16-second count result outputted every second is sent to the decision circuit 65 every second. In light of a predetermined threshold value, the decision circuit 65 decides whether there is a trouble on the line.

Since data transmission at 75 bps is the maximum at the send side, the number of the data inversion points is a maximum of 75 per second and a maximum of 1,200 per 16 seconds. However, if there is a trouble on the line, the maximum number of data inversion points is 2,400 per second, i.e., 38,400 per 16 seconds.

Hence, by using the figure 2,400 per second as a threshold value TH, for example, trouble on the line can be detected by using the subtracter 88 and comparator 89.

The reason why the sum of the data (namely, the inversion points) per 16 seconds is used as the threshold value is because the line could be sometimes disconnected for 1 to 10 seconds. To distinguish such line disconnection, a per 16-second sum is adopted as the threshold value.

(c) Explanation of Majority Circuit

Figure 7A:
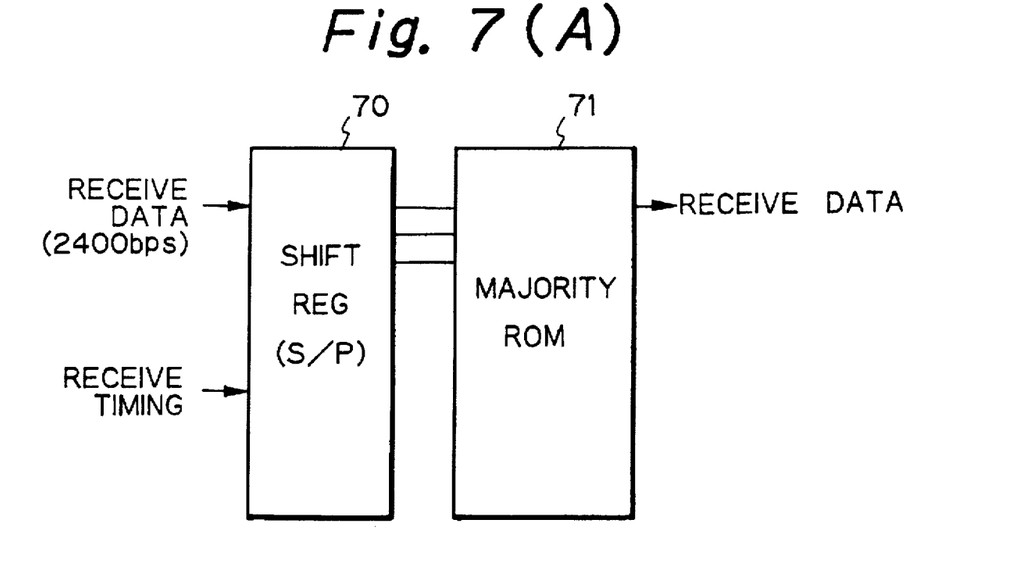
FIGS. 7(A) and 7(B) are block diagrams showing a majority circuit according to the preferred embodiment of the present invention.
Figure 8:
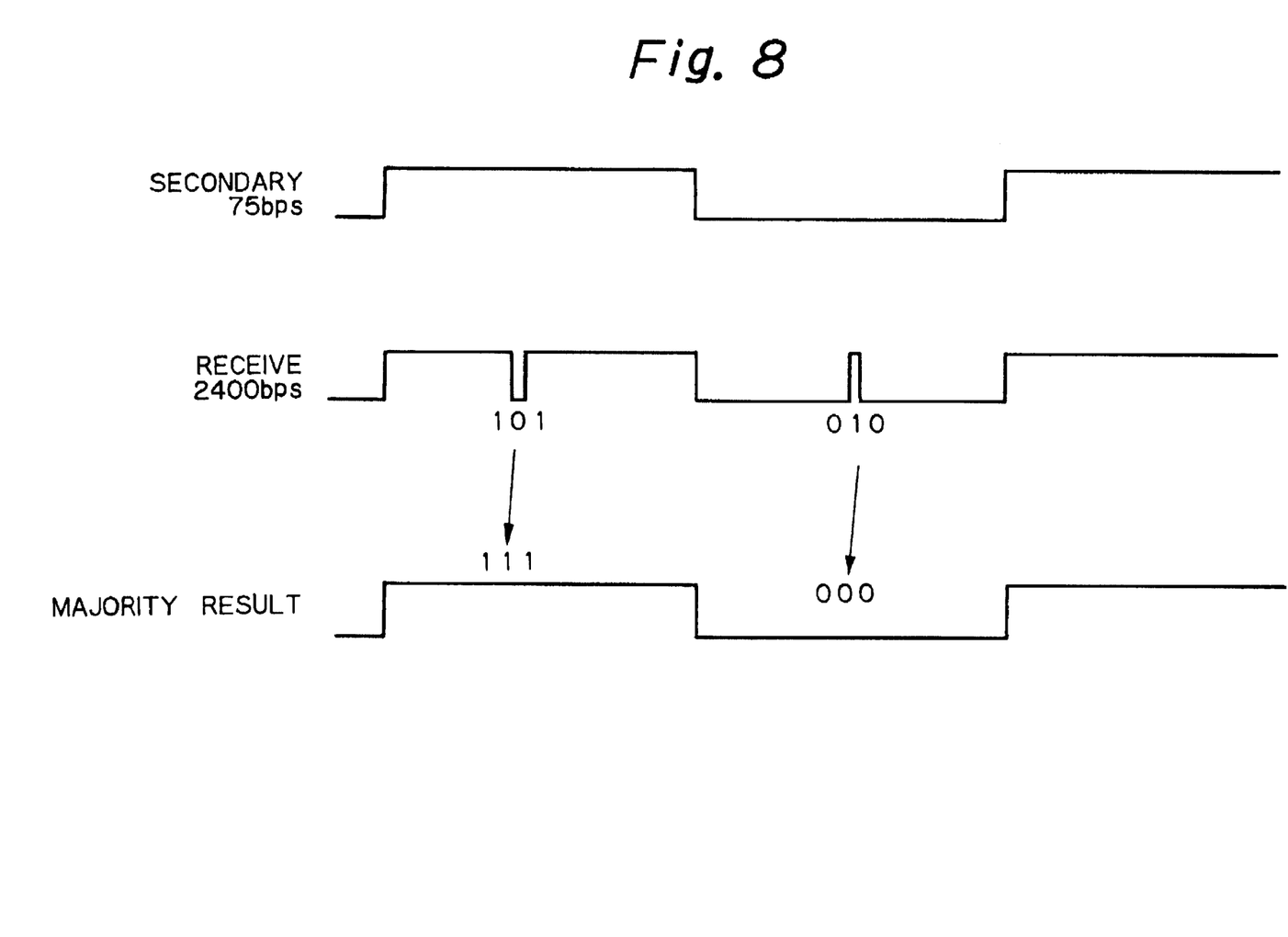
FIG. 8 is an explanatory diagram for explaining majority decision operation according to the preferred embodiment of the present invention.

FIG. 7(A) is a construction view showing the structure of the majority circuit according to the preferred embodiment of the present invention. FIG. 8 is an explanatory diagram for explaining majority decision operation according to the preferred embodiment of the present invention.

Figure 7B:
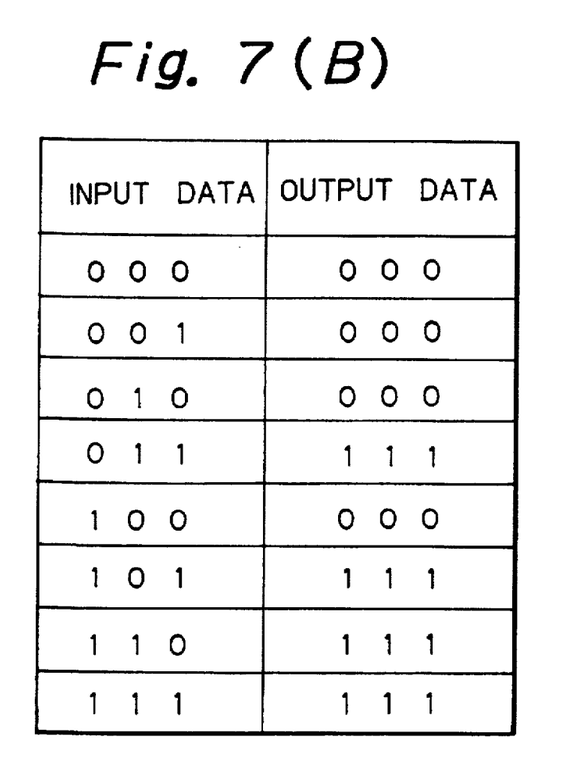

In FIG. 7(A), indicated at numerical reference 70 is a shift register for converting serial-secondary-data at 2,400 bps into 3-bit parallel data. Indicated at numerical reference 71 is a majority ROM in which, as shown in FIG. 7(B), 3-bit majority output data are stored in correspondence to data received therein.

The majority-decision operation will be described with reference to FIG. 8.

As far as the main channel is separated by TDM function, the quality of communication of the secondary channel is simply the same as that of the main channel, which in turn makes it impossible to perform supervisory control by means of the secondary channel even if the line deteriorates.

On the other hand, the speed in the secondary channel may be much slower than that of the main channel, the quality in the secondary channel can be improved by utilizing this.

In other words, in the main channel, the speed of the secondary channel is 2,400 bps, equal to 32 times 75 bps, i.e., the slowest speed necessary for the secondary channel, by processing the receive data in the majority circuit 7, the quality of communication on the secondary channel is improved.

Describing with reference to FIGS. 7(A) and 7(B), the receive data are supplied to the shift register 70 where they are converted into 3-bit parallel data. The parallel data are given to the ROM 71 as address information. The ROM 71 yields outputs as those shown FIG. 7(B) and outputs the majority result.

Hence, as shown in FIG. 8, even if the secondary data (2,400 bps) become "101" or "010" due to deterioration on the line to a certain extent, by performing majority decision, "101" or "010" can be corrected into "111" or "000," respectively. Thus, the quality of communication of the secondary channel is improved, and therefore, stable network supervisory control is performed.

(d) Explanation of Other Embodiments

In addition to the preferred embodiment heretofore described, the following modifications and other embodiments can be made to the present invention.

(1) Although the foregoing has described the preferred embodiment in relation to 9,600 bps modems, the present invention can be applied to modems of other speeds such as 12,000 bps.

(2) Although the foregoing has described the line-disconnection-detect part 6 as a hardware unit, the line-disconnection-detect part 6 may be realized using a microprocessor or the like. That is, the line-disconnection-detect part 6 may be one of the functions which are performed by the supervisory part 5.

(3) Although the foregoing has described the majority circuit 7 as a hardware unit, the majority circuit 7 may be realized as one of the functions which are performed by the supervisory part 5.

(4) Although the foregoing has described that the majority circuit 7 stores 3-bit majorities, the majority circuit 7 may store 4-bit majorities instead.

While the invention has been described in detail, the foregoing description is in all aspects illustrative and not restrictive. It is understood that numerous other modifications and variations can be devised without departing from the scope of the invention.

As described above, the present invention has the following effects.

(1) Since it is possible to detect trouble on the line by means of the secondary channel and the quality of communication on the secondary channel is improved, backup control or the like can be performed even if the line deteriorates.

(2) Performed by calculation of the number of the inversion points and by a majority decision operation, backup control or the like is easy and inexpensive.

We claim:

1. A two-wire full-duplex modem in which data which are time-divided into a main channel and a secondary channel are scrambled, modulated, and thereafter sent by a 2 W–4 W conversion circuit to a two-wire line, following which an estimated echo component, which is calculated from descrambled data, is subtracted from a signal from the 2 W–4 W conversion circuit and the signal from the 2 W–4 W conversion circuit is demodulated, descrambled and separated into main data and secondary data, the two-wire full-duplex modem comprising:

scrambling generator polynomial for scrambling the data for transmission to the two-wire line;

descrambling generator polynomial for descrambling the data received from the two-wire line; and line-trouble detect means, connected to the scrambling generator polynomial and descrambling generator polynomial, for sampling data on the secondary channel by multi-point sampling to obtain the secondary data, thereby detecting a number of inversion points of a signal level in descrambled-secondary channel data per unit time period, and outputting a line-trouble signal which indicates that there is trouble on the line when the number of detected inversion points are more than a predetermined number.

2. A two-wire full-duplex modem as set forth in claim 1, wherein the two-wire line side of the 2 W–4 W conversion circuit is switched to a backup line in accordance with the line-trouble signal which is output by said line-trouble detect means.

3. A two-wire full-duplex modem as set forth in claim 1, wherein said line-trouble-detect means includes a data-inversion-point-detect part for detecting inversion points in the secondary data; a timer for generating a control signal at regular intervals; a counter for counting the number of the data inversion points until being reset by the control signal from the timer; a count-data-store part for storing a predetermined number of count values of the counter just before being reset serially and recursively; an adding part for adding up all count values stored in the count-data-store part; and a decision part for comparing an output of the adding part with a threshold value, deciding whether line-trouble has occurred, and outputting a line-trouble-detect signal.

4. A two-wire full-duplex modem as set forth in claim 3, wherein said count-data-store part is a data-store-memory that includes a predetermined number of ring buffers.

5. A two-wire full-duplex modem as set forth in claim 3, wherein said adding part outputs sum of said count values at regular intervals from the timer, and said decision part decides whether there is trouble on a line at said regular intervals.

6. A two-wire full-duplex modem in which data which are time-divided into a main channel and a secondary channel are scrambled, modulated, and thereafter sent by a 2 W–4 W conversion circuit to a two-wire line, following which an estimated echo component, which is calculated from scrambled data, is subtracted from a signal from the 2 W–4 W conversion circuit and the signal from the 2 W–4 W conversion circuit is demodulated, descrambled and separated into main data and secondary data, the two-wire full-duplex modem comprising:

scrambling generator polynomial for scrambling the data for transmission to the two-wire line;

descrambling generator polynomial for descrambling the data received from the two-wire line; and majority means, connected to the scrambling generator polynomial and descrambling generator polynomial, for outputting a majority signal by a predetermined number of bits of descrambled secondary channel data.

7. A two-wire full-duplex modem as set forth in claim 1, further comprising majority means for outputting a majority signal between a predetermined number of bits of said descrambled secondary channel data.

8. A two-wire full-duplex modem as set forth in claim 6, wherein said majority means further includes:

serial to parallel conversion means for converting the predetermined number of bits serially input to the same number of parallel bits; and majority decision means for outputting a majority data signal due to the decision by majority of said parallel bits input from said serial to parallel conversion means.

9. A two-wire full-duplex modem as set forth in claim 8, wherein said serial to parallel conversion means comprises a shift register.

10. A two-wire full-duplex modem as set forth in claim 8, wherein said majority decision means comprises a majority ROM or a majority decoder circuit.

11. A two-wire full-duplex modem as set forth in claim 7, wherein said majority means further comprises:

serial to parallel conversion means for converting the predetermined number of bits serially input to the same number of parallel bits; and majority decision means for outputting a majority data signal due to the decision by majority of said parallel bit input from said serial to parallel conversion means.

12. A two-wire full-duplex modem as set forth in claim 11, wherein said serial to parallel conversion means comprises a shift register.

13. A two-wire full-duplex modem as set forth in claim 7, wherein said majority decision means comprises a majority ROM or a majority decoder circuit.

14. A two-wire full-duplex modem for transmitting main data and secondary data to a two-wire line and for receiving main data and secondary data from the two-wire line, the two-wire full-duplex modem comprising:

a first polynomial generator scrambling main data and secondary data based upon a first polynomial and transmitting the scrambled main data and secondary data to the two-wire line by way of a 2 W–4 W conversion circuit;

a second polynomial generator descrambling main data and secondary data based on a second polynomial received from the two-wire line by way of the 2 W–4 W conversion circuit, wherein the second polynomial is different from the first polynomial; and a line-trouble detector, coupled to the first polynomial generator and the second polynomial generator, detecting the number of inversion points of a signal level in the descrambled-secondary data per unit time period, and outputting a line-trouble signal which indicates that there is trouble on the two-wire line when the number of detected inversion points are more than a predetermined number.

* * * * *

UNITED STATES PATENT AND TRADEMARK OFFICE
CERTIFICATE OF CORRECTION

PATENT NO. : 5,631,923
DATED : May 20, 1997
INVENTOR(S) : KAKU et al.

It is certified that error appears in the above-indentified patent and that said Letters Patent is hereby corrected as shown below:

Col. 7, line 14, change "descrambled" to --scrambled--.

Col. 8, line 18, change "FIGS. 5" to --FIG. 5--; and change "FIG. 6(A)-6(B)" to --FIGS. 6(A)-6(B)--.

Col. 12, line 18 (Claim 11, line 8), change "bit" to --bits--.

Signed and Sealed this

Twenty-third Day of September, 1997

Attest:

BRUCE LEHMAN

Attesting Officer         Commissioner of Patents and Trademarks